Patented Oct. 12, 1926.

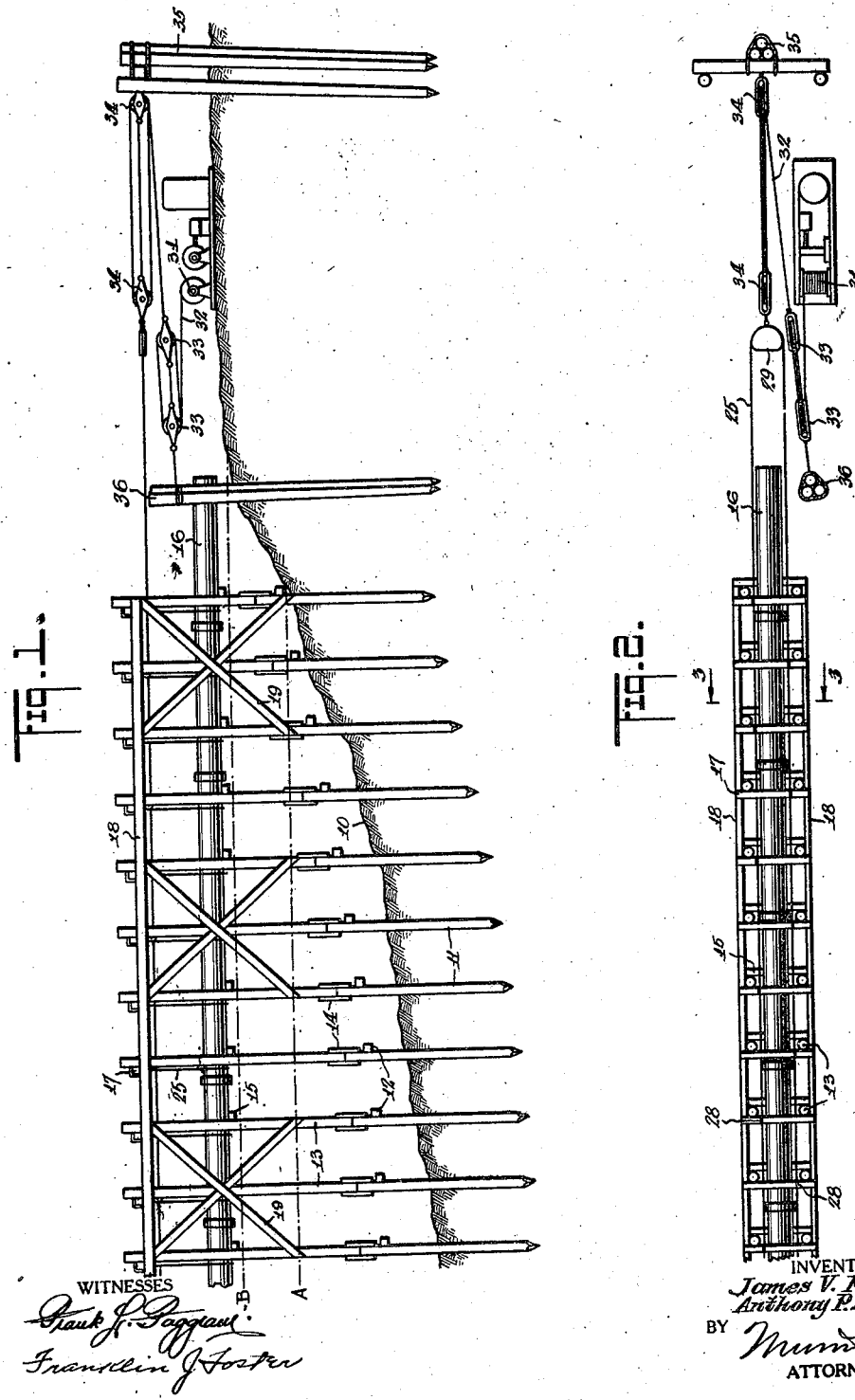

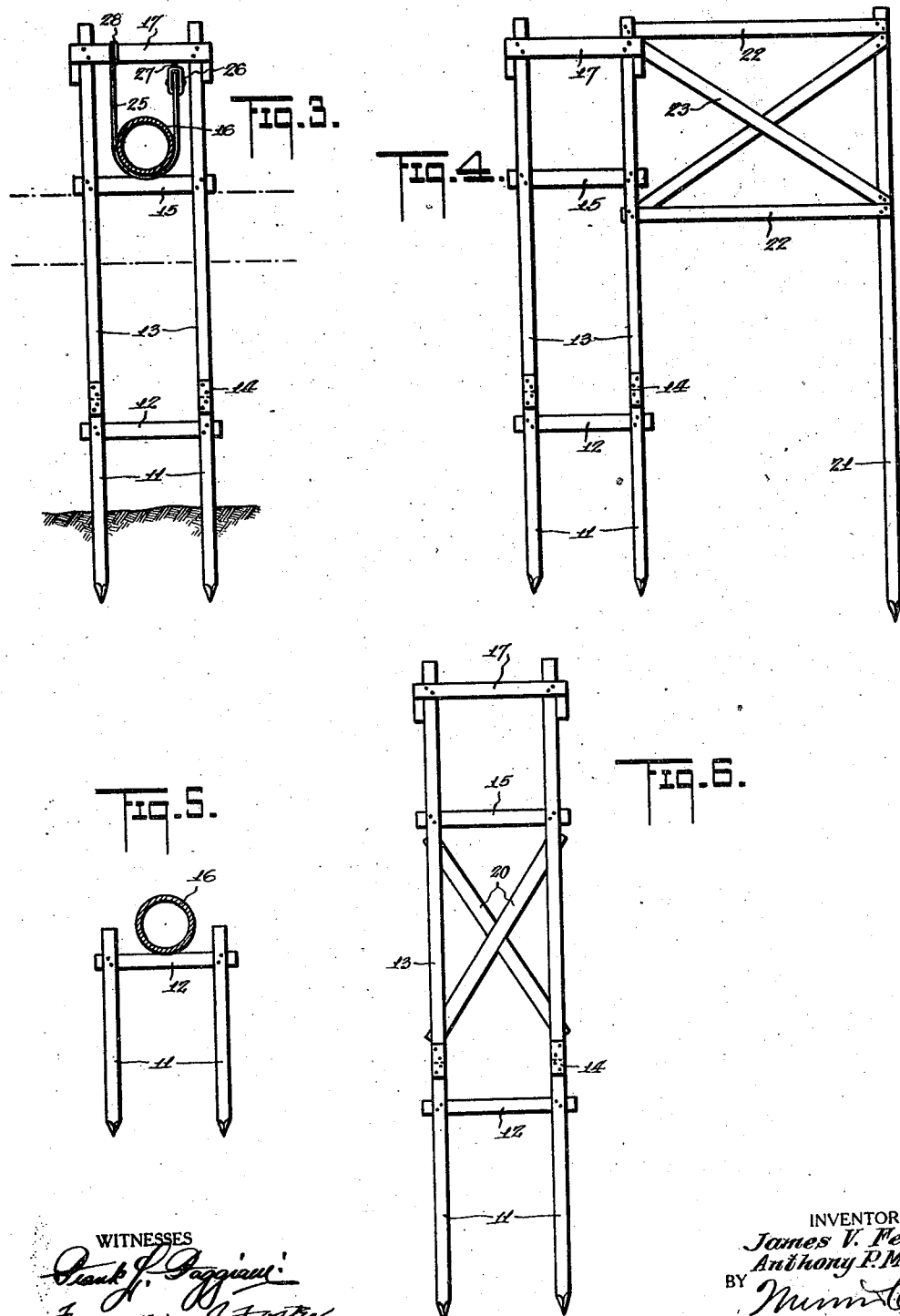

1,603,106

UNITED STATES PATENT OFFICE.

JAMES V. FERRY, OF ATLANTIC CITY, AND ANTHONY P. MILLER, OF PLEASANTVILLE, NEW JERSEY, ASSIGNORS TO JAMES FERRY COMPANY, OF ATLANTIC CITY, NEW JERSEY, A CORPORATION OF NEW JERSEY.

METHOD OF AND APPARATUS FOR LAYING SUBMERGED PIPE LINE.

Application filed February 12, 1926. Serial No. 87,920.

The present invention is concerned with the provision of a novel method for laying pipe line under water in such a manner that the pipe line is securely supported against settlement and subsequent breakage, and in which the pipe is supported at any desired predetermined grade or curvature.

An object of the invention is to provide a method of this character which will eliminate the necessity for the services of divers, and will consequently eliminate the expensive operations of joining pipe sections under water, etc.

A further object of the invention is to provide apparatus which renders possible the use of the method in an inexpensive and efficient manner.

The conventional method of laying pipe under water includes the use of a series of permanent pile bents driven into the bed of the stream or other body of water, under which the pipe is laid. These bents consist of a pair of upright piles and a cross piece, and are for the purpose of supporting the pipe at a predetermined or established grade or curve, and for preventing the possibility of the pipe settling and breaking under the action of the shifting stream bed.

It is customary to drive or hydraulically jet in the pile bent. If the piles are long enough to be reached by a pile driver at the water surface, it is subsequently necessary to cut them off under water. In any event, the services of divers are required for properly laying the pipe sections on the cross pieces of the bents, and for caulking or otherwise suitably joining the sections.

In accordance with the present method, we eliminate all of the disadvantages of the old method. Preferably we support the pipe line above the water line and join it before it is submerged. The entire pipe line is then lowered on to the bents, and the superstructure which supported the pipe line during its joining, is removed without the necessity of cutting off pilings under water.

Among other objects of the invention may be noted the provision of a method which does not require the use of expensive machinery or other apparatus, a method which is well suited to meet the practical requirements of submarine engineering, and a method which will assure the laying of pipe with expedition and at a low labor cost.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a fragmentary view in transverse section through a stream or other body of water and its bed, showing apparatus embodying the present invention in place, and showing a joined pipe line mounted upon the superstructure above the water line, and ready to be lowered into position on the permanent pile bents.

Fig. 2 is a top plan view of Fig. 1.

Fig. 3 is an enlarged transverse sectional view on the line 3—3 of Fig. 1.

Fig. 4 is a front elevational view illustrating a pile bent and its superstructure reinforced by additional frame work.

Fig. 5 shows one of the permanent piling bents with a pipe section supported thereon.

Fig. 6 shows one of the bents with its detachable superstructure reinforced by additional braces for the purpose of shipment.

In the drawings I have used the reference character 10 to designate the bed of a stream, under which it is proposed to lay a submerged pipe line. Assuming that the site of the proposed pipe installation is located in tide water, the dot and dash line A will represent the water level at low tide, and the dot and dash line B will represent the water level at high tide. The apparatus for carrying out the method includes a series of permanent pile bents, one of which is shown in Fig. 5. The permanent bents each include a pair of vertical piles 11 mounting a cross piece 12 near their upper ends. The cross pieces 12 serve as a permanent bed or cradle for the pipe line 16 after the latter has been finally laid.

In accordance with the present invention, we build a removable superstructure or frame upon the permanent bents to support the pipe line above the water level while it is being assembled. After the pipe line has been lowered to its final position on the cross pieces 12, this superstructure is detached and removed. As best seen in Figures 3, 4 and 6, the superstructure includes vertical pilings 13 spliced to the upper ends of the piles 12 as indicated at 14. The splice at 14 is of a character which will permit the pilings 13 to be broken away from the permanent bents by swinging the upper ends of pilings 13 back and forth after the pipe has been laid on the permanent bents. Connecting the pilings 13 preferably just above the water line, are cross pieces 15 which cooperatively provide a temporary rest or cradle for the pipe sections 16 during the joining of the sections. Above the cross pieces 15, adjacent the upper ends of the piles 13 are mounted additional cross pieces 17 which are used in a manner to be later described, for anchoring and guiding the hoisting lines used in handling the pipe.

The first step of the method consists in sinking the permanent bents with the superstructure attached, into the bed of the stream. The relative elevation of the cross pieces 12 of the bents predetermines the slope or curve of the laid pipe line. This curvature has of course been exaggerated in Fig. 1 of the drawings. The presence of the superstructure 13 makes it easy to drive the bents by the use of a floating pile driver, or if desired the bents may be hydraulically jetted into place by the well known jetting method.

After the series of permanent bents with their attached superstructures have been driven into position, as shown in Figs. 1 and 2 of the drawings, the structure may be reinforced by any suitable number of additional bracing members; such for instance as the horizontal braces 18 which connect the upper ends of the rows of piles 13, or by the diagonal braces 19 removably secured to alternate piles 13.

Fig. 6 shows the use of transverse diagonal bracing members 20 for reinforcing the superstructure during the handling or shipment of the bents. and attached frame work.

In the event that the pipe line is to be laid in a rapidly running stream, or if for any reason the bents and frame work are subjected to material lateral stresses by the action of the water thereon, we may use additional bracing frames such as those shown in Fig. 4. Here, extra pilings 21 are driven into the stream bed at one side of the bents, and the superstructure connected to the pilings by a series of horizontal bracing members 22 and diagonal braces 23. It will of course be understood that the particular arrangement of supplemental bracing means, will depend upon the particular conditions encountered at each location where pipe line is to be laid, and are in any event subject to a wide variety of changes and variations.

After the bents and their associated superstructure have been driven or jetted into place in the stream bed, the upper ends of the piles 13 will project above water, and the cross pieces 15 will be disposed at about high water level. The various sections of pipe are now laid upon the temporary cradle defined by the cross pieces 15, and are lined up and joined in any convenient or conventional manner as by caulking or bolting. It is of course desirable that the pipe joints be somewhat flexible in order to permit a slight sag in the pipe line without danger of breaking when the pipe line is lowered into its final position on the bents.

After the pipe has been joined, we attach suitable hoisting apparatus in order to elevate the pipe and permit the cross pieces 15 to be knocked out or removed. As best seen in Fig. 3, the end of a hoisting line 25 is anchored to each upper cross piece 17 as at 28, passed under the pipe 16, and run through a pulley 26 which is hung at 27 on the cross piece. The ends of the hoisting lines 25 are then run to a sling or loop 29. It will be evident that in some instances we need not provide a separate hoisting line on each cross piece, but regardless of the number of the lines, they are arranged so that the position of the successive pulleys and anchorages are alternated, so that when the sling 29 is pulled to elevate the pipe, or released to lower the pipe, there will be no tendency for the pipe to roll and twist in its supporting lines. In other words, the torsional strains on opposite sides of the pipe will be equalized, and the pipe will be raised or lowered without turning.

So far as the mechanism for operating the slings 29 is concerned, any convenient or conventional power unit and power transmitting apparatus might be employed. For purposes of illustration, I have shown a motor driven winch 31, about which is wrapped a hoisting line 32. This line is run through any suitable series of power multiplying sheaves 33, 34 to the sling 29. One convenient method involves the use of a deadman or anchor 35 to which one of the sheave blocks 34 is attached, and the passage of the line or cable from the blocks 34 to the block and tackle 33, which is in turn anchored to another firm anchorage at 36.

After the hauling lines have been attached and made fast, the winch 31 is started, simultaneously hauling on all of the lines 25 and elevating the pipe horizontally from the supporting members 15. The tension on all of the lines 25 should be approximately the same in order to insure a direct upward lift on the pipe. Members 15 are then knocked out, and the winch is operated to slack off on all of the lines 25 and lower the pipe into its permanent position on the cross pieces 12 of the bents. The flexibility of the couplings at the pipe joints will permit the pipe to assume a curvature or grade predetermined by the relative elevations of the successive cross pieces 12. After the pile has come to rest on the cross pieces 12, the lines 25 are untied or released from their anchorages at 28, and by hauling on the sling 29, all of the lines will be drawn out of water, leaving only the pulleys 26 on the frame work. The strengthening frame pieces 18 and 19 are now knocked off or removed. By attaching an end of line to the cross piece 17 or to one of the piles 13, and working these piles back and forth, the relatively weak splice at 14 will be broken and the superstructure will be floated to the surface of the water and may be picked up and reused.

While we have illustrated one form of apparatus by which the method of the present invention may be expeditiously carried out, it is to be understood that numerous changes might be made, both in the apparatus and in the details of the method without departing from the spirit and scope of the appended claims.

It will be evident that instead of using a hoisting winch on shore, we might handle a suitable number of hoisting lines from a floating crane or derrick.

We claim:

1. A method of laying submerged pipe line which includes the steps of lining up and joining the pipe line sections while supporting them upon a temporary frame structure above the level of the water under which the pipe line is to be laid, and subsequently removing said frame and lowering the pipe to its final position on a submerged frame work.

2. A method of laying submerged pipe line which includes the steps of lining up and joining the pipe line sections while supporting them upon a temporary frame structure above the level of the water under which the pipe line is to be laid, lifting the assembled pipe line, removing the temporary frame members, and subsequently lowering the pipe to its final position on a submerged frame work.

3. A method of laying submerged pipe line which includes removably attaching superstructure frames to a series of permanent pile bents, lining up and joining the pipe line sections on the superstructure frames, lifting the pipe line, removing the portions of the superstructure frames which supported the pipe line, and lowering the pipe line into position on the bents.

4. A method of laying submerged pipe line which includes removably attaching superstructure frames to a series of permanent pile bents, lining up and joining the pipe line sections on the superstructure frames, lifting the pipe line, removing the portions of the superstructure frames which supported the pipe line, and lowering the pipe line into position on the bents, and removing the remainder of the superstructure frames.

5. A method of laying submerged pipe line which includes the steps of removably attaching superstructure frames to a series of permanent pile bents, inserting the bents with the attached frames into place in the bed of a body of water under which the pipe line is to be laid, with two parallel series of cross pieces on the frames disposed above the water level, lining up and joining the pipe on the lower series of cross pieces, attaching the standing ends of hoisting lines to the upper cross pieces, passing the lines under the pipe and through pulleys on said cross pieces, hauling on the running ends of all of the lines to lift the pipe, knocking out the series of lower cross pieces, slacking off on all of the lines to lower the pipe into position on the permanent bents.

6. A method of laying submerged pipe line which includes the steps of removably attaching superstructure frames to a series of permanent pile bents, inserting the bents with the attached frames into place in the bed of a body of water under which the pipe line is to be laid, with two parallel series of cross pieces on the frames disposed above the water level, lining up and joining the pipe on the lower series of cross pieces, attaching the standing ends of hoisting lines to the upper cross pieces, passing the lines under the pipe and through pulleys on said cross pieces, hauling on the running ends of all of the lines to lift the pipe, knocking out the series of lower cross pieces, slacking off on all of the lines to lower the pipe into position on the permanent bents, then removing the superstructure frames.

7. A method of laying submerged pipe line which includes the steps of removably attaching superstructure frames to a series of permanent pile bents, inserting the bents with the attached frames into place in the bed of a body of water under which the pipe line is to be laid, with two parallel series of cross pieces on the frames disposed above the water level, lining up and joining the pipe on the lower series of cross pieces, attaching the standing ends of hoisting lines to the upper cross pieces, passing the lines under the pipe and through pulleys on said cross pieces, hauling on the running ends of all of the lines to lift the pipe, knocking out the series of lower cross pieces, slacking off on all of the lines to lower the pipe into position on the permanent bents, detaching the standing ends of the lines and hauling on the lines to free them from the frames, then removing the frames.

8. A method as set forth in claim 7, wherein the superstructure frames are weakly spliced to the permanent bents, and are removed by breaking the splice connections.

9. An apparatus for laying submerged pipe line including a permanent pile bent and a superstructure removably attached to the bent.

10. An apparatus for laying submerged pipe line including a permanent pile bent and a superstructure removably attached to the bent, said superstructure including a pair of horizontal cross bars adapted to be disposed above the water level when the bent is in place in a stream bed.

11. Apparatus for laying submerged pipe line, including a bent formed of two upright piles and a cross piece, and a removable superstructure attached to the bent, including a pair of upright piles spliced to the ends of the piles of the bent, and a pair of cross pieces carried by the second mentioned piles.

JAMES V. FERRY.
ANTHONY P. MILLER.